US008285775B2

(12) United States Patent
Freund et al.

(10) Patent No.: US 8,285,775 B2
(45) Date of Patent: Oct. 9, 2012

(54) EXPEDITED TRANSACTION FAILURE HANDLING BY LEVERAGING A RELIABLE MESSAGE TRANSPORT PROTOCOL TO ASSIST DETECTION OF DISCARDED PROCESSING

(75) Inventors: Thomas J. Freund, Austin, TX (US); Ian Robinson, Swanmore (GB)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 12/603,681

(22) Filed: Oct. 22, 2009

(65) Prior Publication Data
US 2011/0099436 A1 Apr. 28, 2011

(51) Int. Cl.
G06F 15/16 (2006.01)
(52) U.S. Cl. ....................................................... 709/201
(58) Field of Classification Search ................... 709/201
See application file for complete search history.

(56) References Cited

U.S. PATENT DOCUMENTS

| | | |
|---|---|---|
| 6,961,865 B1 | 11/2005 | Ganesh et al. |
| 2003/0101368 A1 | 5/2003 | Swain et al. |
| 2004/0205781 A1* | 10/2004 | Hill et al. ...................... 719/328 |
| 2006/0075277 A1* | 4/2006 | Johnson et al. ..................... 714/4 |
| 2006/0123128 A1* | 6/2006 | Feingold et al. .............. 709/230 |
| 2006/0206558 A1* | 9/2006 | Cohen et al. .................. 709/201 |
| 2009/0157767 A1* | 6/2009 | Doty et al. .................... 707/202 |
| 2009/0172183 A1* | 7/2009 | Derksen et al. ............... 709/232 |
| 2009/0300097 A1* | 12/2009 | Meyer ........................... 709/203 |

OTHER PUBLICATIONS

Frank Vahid, "The Softening of Hardware," Computer, vol. 36, No. 4, pp. 27-34, Apr. 2003, doi:10.1109/MC.2003.1193225.*
Steve McConnell, "Who Needs Software Engineering?," IEEE Software, vol. 18, No. 1, pp. 5-8, Jan./Feb. 2001, doi:10.1109/MS.2001.903148.*
Andrew Tanenbaum, Structured computer organization; (2nd ed.), Prentice-Hall, Inc., Upper Saddle River, NJ, 1984.*
Specification "Web Services Coordination (WS-Coordination)" (Nov. 2004) to Cabrera et al. ("Cabrera").*
IEEE Proceedings paper "An analysis of reliable delivery specifications for Web Services" (Apr. 2005) to Pallickara et al. ("Pallickara").*
Book Networking for Dummies (2005) to Lowe ("Lowe"), p. 37.*

* cited by examiner

Primary Examiner — David England
Assistant Examiner — June Sison
(74) Attorney, Agent, or Firm — Gibb & Riley, LLC

(57) ABSTRACT

A method and system for immediate failure checking for lost message processing comprises receiving a first message of a web-service transaction comprising first message sequence information at a computing device in a transaction environment of a target web service, storing a first record of the first message within the computing device, receiving a subsequent message comprising corresponding message sequence information at the computing device, storing a second record of the subsequent message within the computing device, comparing the first message sequence information with the subsequent message sequence information using the computing device, identifying a transaction error using the computing device, if the subsequent message is not an initial message in a sequence of messages based on the comparing, reporting the transaction error from the computing device, and aborting processing of the web-service transaction if the transaction error has occurred, using the computing device.

17 Claims, 4 Drawing Sheets

EXPEDITED TRANSACTION FAILURE HANDLING BY LEVERAGING A RELIABLE MESSAGE TRANSPORT PROTOCOL TO ASSIST DETECTION OF DISCARDED PROCESSING

BACKGROUND

The embodiments of the invention generally relate to expedited error handling for transactions where previous portions of a transactional interchange may have been lost, discarded and forgotten, and more specifically relate to automated early detection of transaction failure situations and leveraging a reliable message transport protocol to determine appropriate transaction service interactions.

For efficiency of non-failure processing, transaction coordination protocols typically do not mandate that implementations durably record any transactional information (e.g., transactional registration state, coordinator address, or transaction identifier) until the execution of phase 1 (i.e., the voting phase) of a transaction commitment protocol has completed.

In the past, there might be a 2 message request which makes up a transaction. Request 1 might fail due to the recipient (participant 1) going down and, upon restarting, having forgotten about the Request 1. When Request 2 is received, the same recipient (now registered as participant 2) will receive and process the message. Note participant 1 and 2 are the same entity. When the requester commits the transaction, messages will be sent to participants 1 and 2 telling them to commit. Only when Participant 1 fails to respond will the problem of the loss of Request 1 be discovered.

BRIEF SUMMARY

Disclosed herein is a computer-implemented method for failure checking for lost message processing. The method comprises receiving a first message of a web-service transaction comprising first message sequence information at a computing device in a transaction environment of a target web service, storing a first record of the first message within the computing device, receiving a subsequent message comprising corresponding message sequence information at the computing device, storing a second record of the subsequent message within the computing device, comparing the first message sequence information with the subsequent message sequence information using the computing device, identifying a transaction error using the computing device, if the subsequent message is not an initial message in a sequence of messages based on the comparing, reporting the transaction error from the computing device, and aborting processing of the web-service transaction if the transaction error has occurred, using the computing device.

Disclosed herein is a web service system for immediate failure checking for lost message processing. The system comprises an input/output device of a computing device within a transaction environment of a target web service that receives a first message that includes first message sequence information, and receives a subsequent message including corresponding subsequent message sequence information, a storage device operatively connected to the input/output device that stores a first record of the first message, and a second record of the subsequent message, and a processor operatively connected to the input/output and the storage device that identifies a transaction error if the subsequent message is not an initial message in a sequence of messages by comparing the first message sequence information with the subsequent message sequence information. The input/output device reports the transaction error, and the processor aborts at least one of the first transaction and a subsequent transaction if the transaction error has occurred.

Also disclosed herein is a computer program product for failure checking for lost message processing. The computer program product comprises a computer readable storage medium having computer readable program code embodied therewith. The computer readable program code is configured to receive a first message of a web-service transaction comprising first message sequence information at a computing device in a transaction environment of a target web service, store a first record of the first message within the computing device, receive a subsequent message comprising corresponding message sequence information at the computing device, store a second record of the subsequent message within the computing device, compare the first message sequence information with the subsequent message sequence information using the computing device, identify a transaction error using the computing device, if the subsequent message is not an initial message in a sequence of messages, report the transaction error from the computing device, and abort processing of the web-service transaction if the transaction error has occurred, using the computing device.

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION

The embodiments of the invention and the various features are explained more fully with reference to the non-limiting embodiments that are illustrated in the accompanying drawings and detailed in the following description.

The embodiments herein provide immediate failure checking for lost message processing conditions by leveraging a reliable message transport protocol (e.g., Web Services Reliable Exchange, (WS-RX)), when present, and utilizing the reliable message exchange sequence information on transaction registration to determine if a failure has occurred. When a transaction registration is determined to be required for any message other than the first (initial) message in a sequence of messages, then the transaction service flags an error and aborts the transaction.

Embodiments herein detect this failure before additional processing of subsequent messages. When a subsequent message is received, the receiver/web service receives the message under a transactional context. The receiver/web service realizes that this is not the first message in the sequence for the transaction (by using reliable message transport protocol sequence number) and the receiver/web service realizes that the receiver/web service must have previously lost one or more previous messages for some reason. Failure can thus be reported immediately.

The embodiments herein provide early detection of transactions that ultimately will result in transaction failure, without impacting the application. Such situations are more likely to arise in the loosely coupled distributed environments (e.g., those typified by Web Services (WS)-Business Activity scenarios). Early detection allows errors to be handled in a more timely fashion enabling more productive forward processing by avoiding the cascade effect of handling pending errors in a delayed manner.

Figure 1:
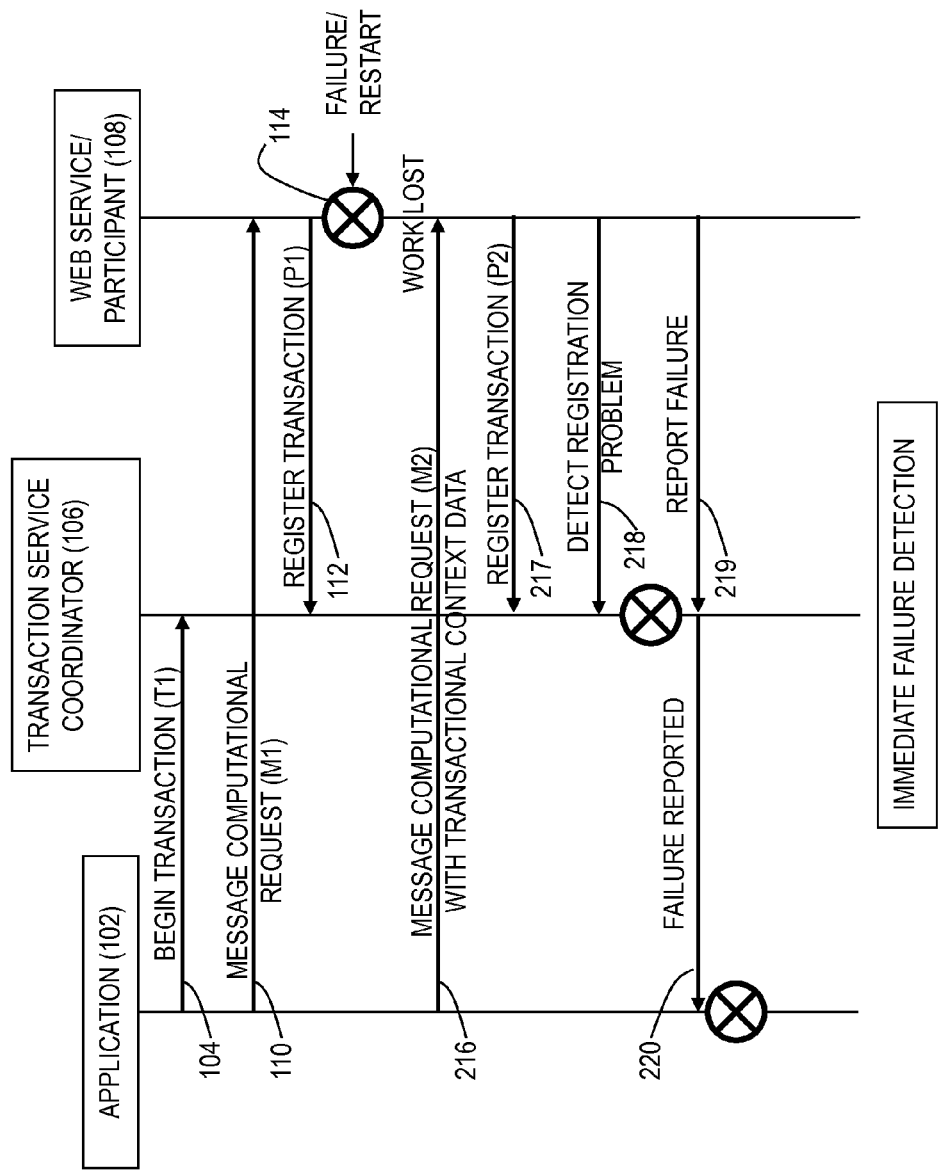
FIG. 1 illustrates a schematic diagram of embodiments of the invention that detect early failure before additional processing subsequent messages.

Referring to FIG. 1, application 102 begins a transaction "T1" 104 by communicating with transaction service coordinator 106. Web Service/Participant 108 receives a message computational request "M1" 110 from application 102, and registers for the transaction "T1" 112 as "P1" with the coordinator 106 and processes message "M1," including any updates. The first message computational request "M1" may or may not include transactional context data.

The participant 108 may fail during processing of message "M1" (at 114). Participant 108 would restart after failing and would restart with all the work resulting from message "M1" having been discarded, and would similarly discard any knowledge of the transaction "T1" occurring. This is often referred to as "transaction amnesia."

The participant 108 receives a subsequent message computational request "M2" 216 sent from application 102, and registers the transaction as "P2" 217 with coordinator 106 and processes message "M2". However, message computation request "M2" includes transactional context data indicating that it is not the initial message, but is one of the subsequent messages within a sequence of messages, (e.g., a WS-Coordination CoordinationContext). Thus, the participant 108 determines via the transactional context data, e.g., a reliable message transport protocol sequence number, or exchange sequence information, that the message "M2" is not the first or initial message in a message sequence of the transaction "T1" 218.

Message sequence information is typically carried with reliable message transport protocols (e.g., WS-RX) to determine an appropriate registration of transactional messages via a reliable message transport protocol sequence number. The embodiments of the invention augment the transaction protocols (e.g., Web Service Transaction (WS-TX)) to proactively determine failures for transactions involving multiple messages. The embodiments of the invention require no explicit action on the part of the application 102 and are completely interoperable.

Since there is no record of the transaction T1 in the target environment of participant 108, an "amnesia" condition is determined to have occurred. Thus, participant 108 can immediately report a failure 219 to coordinator 106. Likewise, the coordinator 106 transmits the report of the failure 220 of transaction "T1" to application 102.

WS-Coordination is a Web Services specification and provides an extensible framework for providing protocols that coordinate the actions of distributed applications. These coordination protocols are used to support a number of applications, including those that need to reach consistent agreement on the outcome of distributed transactions. The framework defined in the WS-Coordination specification enables an application service to create a context needed to propagate an activity to other services and to register for coordination protocols. This framework enables existing transaction processing, workflow, and other systems for coordination to hide their proprietary protocols and to operate in a heterogeneous environment. Additionally WS-Coordination describes a definition of the structure of context and the requirements for propagating context between cooperating services.

Figure 2:
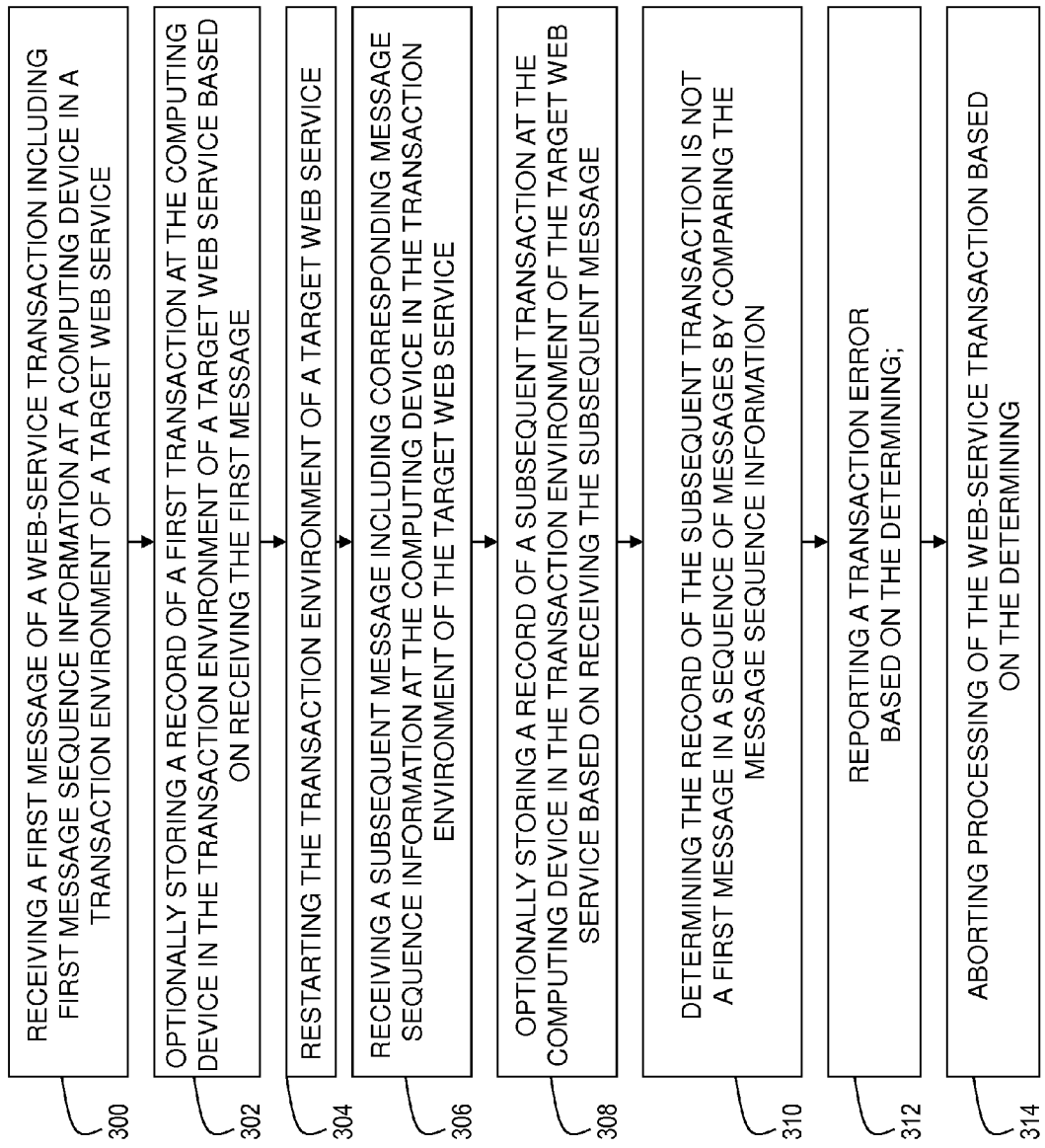
FIG. 2 illustrates a schematic flow chart of a method of the embodiments of the invention.

FIG. 2 illustrates an exemplary embodiment of a computer-implemented method for immediate failure checking for lost message processing including receiving 300 a first message of a web-service transaction including first message sequence information at a computing device (see FIGS. 3 and 4, discussed below, for details of the computing device) in a transaction environment of a target web service and storing 302 a record of the first transaction at the computing device in the transaction environment of a target web service based on receiving the first message.

The transaction environment of a target web service may have to be restarted 304 for various reasons and circumstances. A subsequent message could then be received 306 including corresponding message sequence information at the computing device in the transaction environment of the target web service. A record of the subsequent transaction is stored 308 at the computing device in the transaction environment of the target web service.

The computing device determines 310 if the record of the subsequent transaction is not the initial or first message in the sequence of messages by comparing the first message sequence information with the subsequent message sequence information. This identifies whether a transaction error has occurred. Finally, the transaction error is reported 312, and processing of the web-service transaction can be terminated, stopped, aborted, etc. 314.

Figure 3:
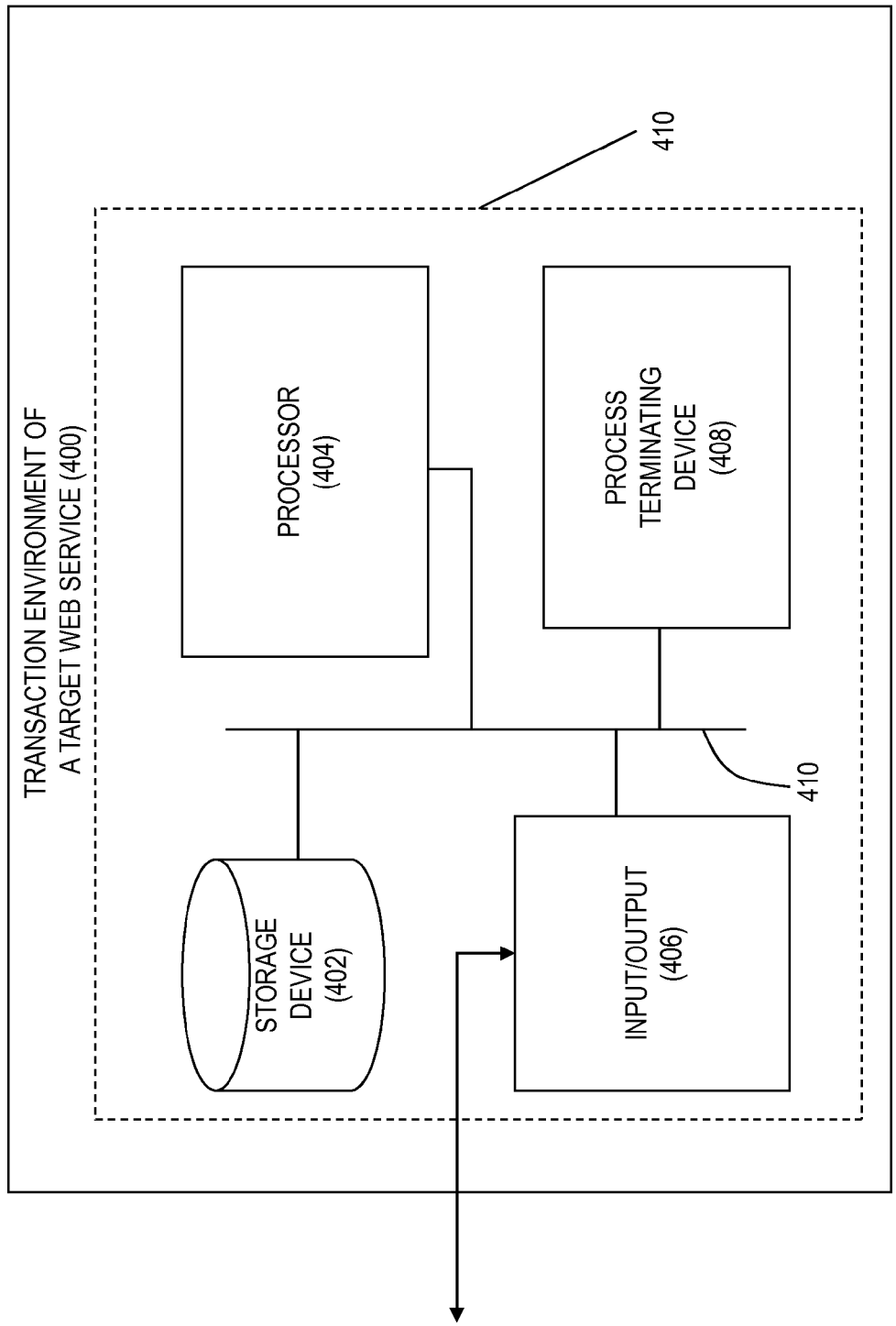
FIG. 3 illustrates a schematic flow chart of components in a system of the embodiments of the invention.

FIG. 3 illustrates an exemplary embodiment of a web service system for immediate failure checking for lost message processing. Item 400 schematically represents the transaction environment of the target web service. Items 402, 404, 406, and 408 may represent a special purpose or general purpose computing device 410 or may represent diverse and separate devices.

The input/output 406 receives the first message that includes first message sequence information, and a subsequent message including corresponding subsequent message sequence information. A storage device 402 stores a record of the first message (a first transaction), and a record of the subsequent message (subsequent transaction).

The processor 404 identifies a transaction error by comparing the first message sequence information with the subsequent message sequence information. In this way the processor 404 determines whether the record of the subsequent transaction is not a first (initial) message in a sequence of messages. The input/output 406 reports the transaction error. Finally, the processor 404 or a dedicated process terminating device 408 aborts (stops, terminates, etc.) the first transaction and/or the subsequent transaction if a transaction error has occurred. Storage device 402, processor 404, input/output device 406, and process terminating device 408 are operatively connected to (directly or indirectly connected to) one another and therefore may be connected by a communication bus or by wireless connections (item 410 represents all such operative connections).

Figure 4:
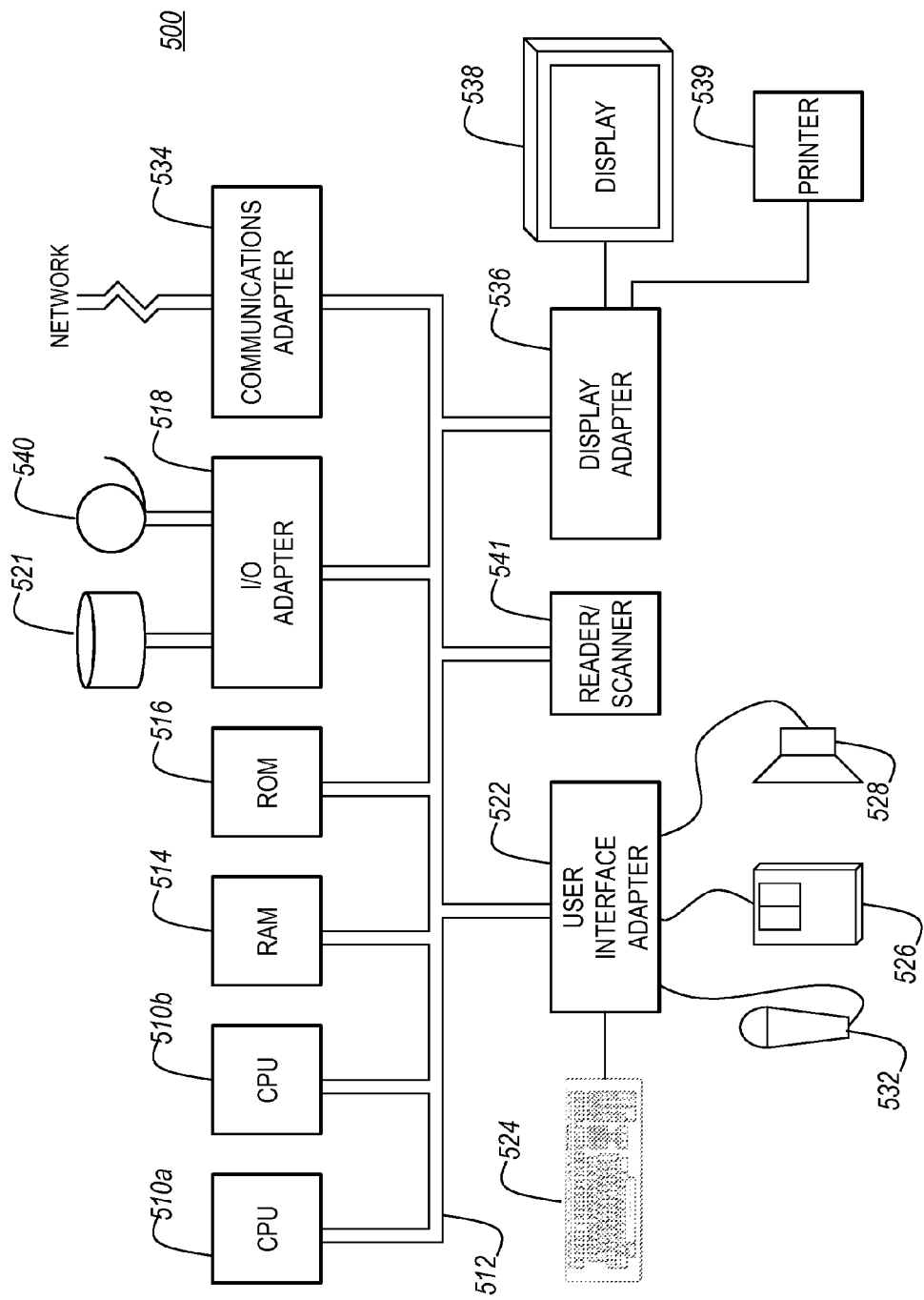
FIG. 4 is a schematic diagram illustrating an exemplary hardware environment that can be used to implement the embodiments of the invention.

Referring now to FIG. 4, system 500 illustrates a typical hardware configuration which may be used for implementing the embodiments herein. For example, the configurations shown in FIG. 4 could implement the method for immediate failure checking for lost message processing that is described above. The configuration may include at least one processor or central processing unit (CPU) 510a, 510b. The CPUs 510a, 510b are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539. Further, an automated reader/scanner 541 may be included. Such readers/scanners are commercially available from many sources.

As will be appreciated by one skilled in the art, the embodiments of the invention may be embodied as a system, method or computer program product. Accordingly, the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the embodiments of the invention may be written in an object oriented programming language such as Java, Smalltalk, C++ or the like. However, the computer program code for carrying out operations of the embodiments of the invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the invention has been presented for purposes of illustration and description, but is not intended to be exhaustive or limited to the embodiments of the invention in the form disclosed. Many modifications and variations will be apparent to those of ordinary skill in the art without departing from the scope and spirit of the embodiments of the invention.

What is claimed is:

1. A computer-implemented method for failure checking for lost message processing, said method comprising:
    receiving a first message of a web-service transaction comprising first message sequence information, said first message being received at a computing device in a transaction environment of a target web service;
    storing a first record of said first message within said computing device, said first record including said first message sequence information;
    registering for said web-service transaction with a transaction service coordinator based on said receiving of said first message, using said computing device;
    receiving a subsequent message at said computing device, said subsequent message comprising corresponding subsequent message sequence information;
    storing a second record of said subsequent message within said computing device, said second record including said subsequent message sequence information;
    comparing said first message sequence information with said subsequent message sequence information using said computing device;
    when attempting to register another web-service transaction with said transaction service coordinator based on receiving said subsequent message, identifying a transaction error using said computing device, when said subsequent message is not an initial message in a sequence of messages based on said comparing;
    reporting said transaction error from said computing device to said transaction service coordinator; and
    immediately aborting processing of said web-service transaction when said transaction error has occurred, said aborting processing using said computing device.

2. The computer-implemented method according to claim 1, wherein at least one of said first message sequence information and said subsequent message sequence information comprises a reliable message transport protocol.

3. The computer-implemented method according to claim 1, wherein at least one of said first message sequence information and said subsequent message sequence information comprises exchange sequence information.

4. The computer-implemented method according to claim 1, wherein said transactional environment of said target web service comprises a receiver.

5. The computer-implemented method according to claim 1, said comparing comprising comparing said first record with said second record.

6. The computer-implemented method according to claim 1, said comparing being performed exclusively by said computing device.

7. A hardware system for a web service for immediate failure checking for lost message processing, said system comprising:
    an input and output device of a computing device within a transaction environment of a target web service that receives a first message that includes first message sequence information, and receives a subsequent message including corresponding subsequent message sequence information;
    a non-transitory storage device operatively connected to said input and output device that stores a first record of said first message, and a second record of said subsequent message; and
    a processor operatively connected to said input and output device and said storage device, said processor registers a web-service transaction with a transaction service coordinator based on receiving said first message and, when said processor attempts to register a subsequent web-service transaction with said transaction service coordinator based on receiving said second message, said processor identifies a transaction error when said subsequent message is not an initial message in a sequence of messages by comparing said first message sequence information with said subsequent message sequence information,
    said input and output device reporting said transaction error, and
    said processor aborting at least one of a first transaction and a subsequent transaction when said transaction error has occurred.

8. The hardware system for a web service according to claim 7, wherein at least one of said first message sequence information and said subsequent message sequence information comprises a reliable message transport protocol.

9. The hardware system for a web service according to claim 7, wherein at least one of said first message sequence information and said subsequent message sequence information comprises exchange sequence information.

10. The hardware system for a web service according to claim 7, wherein said transactional environment of said target web service comprises a receiver.

11. The hardware system for a web service according to claim 7, said processor comparing said first record with said second record to identify said transaction error.

12. A non-transitory computer readable storage medium for failure checking for lost message processing in a transaction environment of a target web service, said non-transitory computer readable storage medium having computer readable program code embodied therewith, the computer readable program code being configured to:
    receive a first message of a web-service transaction comprising first message sequence information;
    store a first record of said first message within a computing device, said first record including said first message sequence information;
    register for said web-service transaction with a transaction service coordinator based on said receiving of said first message;
    receive a subsequent message comprising corresponding subsequent message sequence information;
    store a second record of said subsequent message within said computing device, said second record including said subsequent message sequence information;
    compare said first message sequence information with said subsequent message sequence information;

register a second web-service transaction with said transaction service coordinator based on receiving said second message;

when attempting to register another web-service transaction with said transaction service coordinator based on receiving said subsequent message, identify a transaction error, when said subsequent message is not an initial message in a sequence of messages;

report said transaction error to said transaction service coordinator; and immediately abort processing of said web-service transaction when said transaction error has occurred.

13. The non-transitory computer readable storage medium according to claim 12, wherein at least one of said first message sequence information and said subsequent message sequence information comprises a reliable message transport protocol.

14. The non-transitory computer readable storage medium according to claim 12, wherein at least one of said first message sequence information and said subsequent message sequence information comprises exchange sequence information.

15. The non-transitory computer readable storage medium according to claim 12, wherein said transactional environment of said target web service comprises a receiver.

16. The non-transitory computer readable storage medium according to claim 12, said computer readable program code being configured to compare said first message sequence information with said subsequent message sequence information by comparing said first record with said second record.

17. The non-transitory computer readable storage medium according to claim 12, said computer readable program code being configured to compare said first message sequence information with said subsequent message sequence information exclusively using said computing device.

* * * * *